United States Patent [19]
Berry et al.

[11] 3,886,440
[45] May 27, 1975

[54] PROTON PRECESSION MAGNETOMETER SENSOR

[75] Inventors: Mark Edward Berry, Mountain View; Thomas R. Tullsen, San Jose, both of Calif.

[73] Assignee: GeoMetrics, Sunnyvale, Calif.

[22] Filed: Oct. 23, 1973

[21] Appl. No.: 408,267

[52] U.S. Cl. .............................. 324/.5 E; 324/.5 R
[51] Int. Cl. .......................................... G01r 33/08
[58] Field of Search ................ 324/.5 R, .5 E, .5 G

[56] References Cited
UNITED STATES PATENTS

| | | | |
|---|---|---|---|
| 2,856,579 | 10/1958 | Packard | 324/.5 E |
| 3,004,211 | 10/1961 | Anderson | 324/.5 E |
| 3,173,081 | 3/1965 | Barringer | 324/.5 E |
| 3,281,662 | 10/1966 | Kuberry | 324/.5 E |
| 3,526,002 | 8/1970 | Waddel | 324/.5 E |

Primary Examiner—Alfred E. Smith
Assistant Examiner—Michael J. Tokar

[57] ABSTRACT

An improved proton precession magnetometer sensor is provided for improving the performance of a magnetometer by a factor of as much as three to four. The sensor comprises a main solenoidal, toroidal or similarly shaped coil or coils together with orthogonally disposed compensation coils immersed in a proton-ladened fluid contained in a fluid-tight housing. Each coil is comprised of a plurality of insulated turns of relatively small gauge, multi-strand wire. The coils, if solenoidal, are electrically coupled and strapped or otherwise bound together to fit within the housing. An electrical connection to a magnetometer console is provided by a cable connected to the main and the compensating coils.

10 Claims, 8 Drawing Figures

PATENTED MAY 27 1975 3,886,440

SHEET 2

PROTON PRECESSION MAGNETOMETER SENSOR

BACKGROUND OF THE INVENTION

The present invention is related generally to proton precession magnetometers and in particular to an improved sensor for improving the performance of a magnetometer by increasing the signal-to-noise ratio of the sensor.

Conventional proton precession magnetometers are provided with a sensor having one or more and typically two-coil main solenoids or a single main toroidal coil. The coils are held in a housing filled with a proton-ladened fluid such as, for example, kerosene, white gas or water. To compensate for extraneous external electromagnetic noise, there is further provided in series with the main coils a compensating coil which comprises a few turns of wire about the orthogonal axes of the main coils. The sensor is coupled as by a cable to a console which contains a power supply and readout circuits which translate a proton precession signal received from the sensor to a value corresponding to the intensity of a magnetic field being measured — e.g., the earth's magnetic field. In addition to powering the console electronics, the power supply also provides a direct current of less than one or up to several amperes to produce a strong, uniform magnetic field in the coil to polarize the protons in the fluid — i.e., align the protons with this polarizing field.

The polarizing current is then turned off and the protons precess about the ambient field in the main coils. As the protons move from their uniform polarized orientation, they begin precessing in-phase about a single direction — i.e., the axis of precession — which is parallel to the ambient field direction. The precession of protons will then generate a small signal in the same coil used to polarize the protons, and this signal will be the sum of the in-phase signals of all the precessing protons. The frequency of this signal is proportional to the ambient field intensity which is being measured.

The polarizing current in the main coil, though terminated abruptly by the power supply, continues to flow as eddy currents for a short time during its decay. If these eddy currents and their magnetic fields associated with them decay too slowly — i.e., in a period approaching one period of the precession frequency — the alignment of the precessing protons will follow the fast changing, scrambled directions of the decaying polarizing field. The alignment of the protons will be spoiled, the protons will be out of phase with each other and their sum will result in the generation of a weak signal.

These eddy currents, which may be thought of as flowing in small loops perpendicular to the wire in the coils, opposing the collapse of the coil flux, can persist for a few milliseconds after the applied polarizing field current that is in the coils has been reduced to zero. The precession frequency in the earth's magnetic field of 0.5 gauss is approximately 2 kilohertz, equivalent to a period of 0.5 milliseconds. The persistence of these eddy currents would typically extend to 4 or 6 precession cycles affecting the precession signals at a time when they would otherwise be at their maximum amplitude, thus reducing the possible signal amplitude and therefore signal-to-noise. The larger the magnitude of these eddy currents and the longer they flow, the greater their effect on spoiling the precession signal. The magnitude of these currents and their duration are, in turn, found to be related to the diameter of the wire used in the coils.

A loss or weakening of the usable precession signal is also found to be caused by steady state alternating eddy currents which are induced in the coils by the precession signal itself. These steady state alternating eddy currents, being of very small amplitude, have a negligible effect on the precessing protons in terms of skewing or scrambling them; however, they do lead to a dissipation of energy in the coils, which results in a loss of signal power and an increase in the noise bandwidth, both of which decrease the sensor signal-to-noise ratio.

It would therefore be desirable to utilize thinner wire in the windings of the sensor to reduce the deleterious effects of the eddy currents. Thinner wire, by itself, however, is found to have associated with it several drawbacks, among which are the requirement for higher voltage and its attendant problems; a higher "Q" with its tuning, microphonic and switching problems; and other electrical and mechanical difficulties.

SUMMARY OF THE INVENTION

In view of the foregoing, the principal object of the present invention is an improved proton precession magnetometer sensor exhibiting a higher signal-to-noise ratio than conventional sensors of comparable size and weight by eliminating or minimizing the aforementioned disadvantages of conventional sensors.

The principal feature of the improved sensor is a novel and unique means of constructing the main coils, which are used for both polarization and for signal detection. The coils comprise a plurality of insulated turns of multi-strand, relatively small gauge wire. Typically, each turn comprises 19 strands of 26-gauge wire, which is equivalent to a single wire of 12 or 13-gauge wire. In other words, a plurality of very small wires is used in substitution for a single wire as used in a conventional sensor.

The main coils are wound as a toroid, solenoid, or similarly-shaped coil and, in the latter two cases, are internally electrically interconnected in a series-opposing relationship.

The coil or coils are bound together and immersed in a proton-ladened fluid contained in a fluid-tight housing. To compensate for extraneous external electromagnetic fields, there is further provided in series with the main coils a compensating coil comprising a few turns of wire about each of the three orthogonal axes of the coils.

In comparison with conventional sensors of comparable size and weight, total resistance, inductance and, in a general way, "Q", tests have shown that the sensor of the present invention exhibits an increased signal-to-noise ratio by a factor of as much as three to four. The multi-strand wire achieves greater signal amplitude during precession by minimizing the precession signal effects of eddy currents. The multi-strand wire does not affect noise, and the increase in signal therefore results in an increase in signal-to-noise. This increase in signal-to-noise ratio permits reducing the size and weight of sensors and power supplies heretofore required for adequately generating and detecting a given precession signal and therefore provides considerable advantages in airborne and portable magnetometer applications.

DESCRIPTION OF DRAWINGS

The foregoing and other objects, features and advantages of the present invention will be apparent from the following detailed description of the accompanying drawing in which.

DETAILED DESCRIPTION

Figure 1:
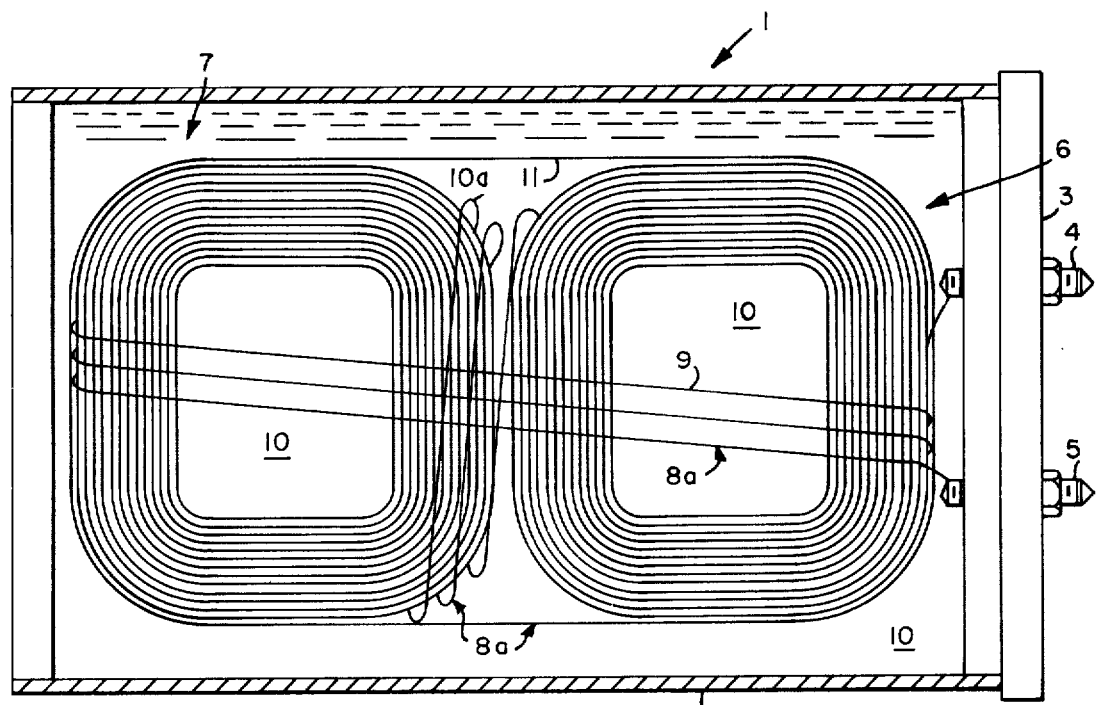
FIG. 1 is a cross-sectional view of a dual coil sensor in accordance with the present invention.

Referring to FIG. 1, there is provided in accordance with the present invention an improved proton precession magnetometer sensor 1 comprising a fluid-tight housing 2. Housing 2 is provided at one end with a fluid-tight bulkhead 3 through which extends a pair of feed-through electrical terminals 4 and 5. Coupled to the interior ends of terminals 4 and 5 and mounted in a side-by-side relationship within housing 2 are a plurality of solenoid coils 6 and 7, each having a principal axis A—A as seen in FIG. 2.

Figures 2, 2A:
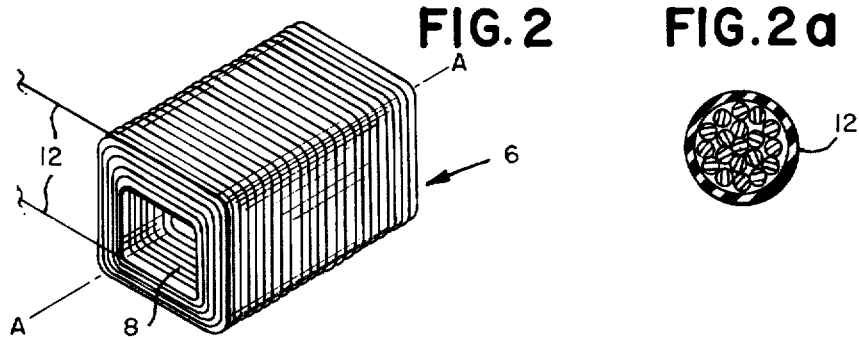
FIG. 2 is a perspective view of one of the coils of FIG. 1.
FIG. 2A is a cross-sectional view of the wire of the coil of FIG. 2.

Referring to FIG. 2, each of coils 6 and 7 is formed in a generally rectangular shape and is provided with a hollow core 8. Wrapped about hollow core 8 and axis A—A there are provided a predetermined plurality of insulated turns of multistrand, small-gauge wire 12 as shown in FIG. 2a. It is understood, however, that the number of turns, the number of strands and the gauge of the wire used may vary from application to application and depends on the amount of inductance required for a sensor in a particular application. In a typical applicaton wherein the sensor is used — for example, as in an airborne magnetometer system — the coils each comprise 325 turns of 26-gauge 19-strand wire.

Figure 3:
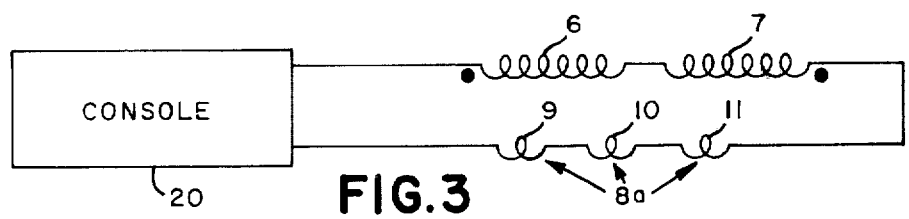
FIG. 3 is a block diagram and schematic of a magnetometer system using the sensor of FIG. 1.

As shown in FIG. 3, coils 6 and 7 are electrically interconnected in series opposing relationship as is conventionally indicated by the dots appearing at opposite ends of the coils. In addition, there is provided in series with coils 6 and 7, a compensation coil 8a comprising three windings 9, 10 and 11, of a few turns each about the three orthogonal axes of the housing 2 and generally about coils 6 and 7 as seen in FIG. 1. Coil 8a serves to "buck-out" the effects of exterior extraneous magnetic fields in a conventional manner. The number of turns about each orthogonal axis depends on the coil configuration and is generally chosen for each sensor.

Coils 6, 7 and 8a are immersed in housing 2 in a proton laden fluid 10, such as kerosene or white gas. Kerosene is typically used in airborne sensors. White gas is typically used in marine sensors as will be described below.

The terminals 4 and 5 of sensor 1 are coupled, as by a cable, to a console 20. Console 20 is any conventional unit used in magnetometry for containing a power supply and the necessary electronics for translating a signal generated by sensor 1 to a reading representing the intensity of a magnetic field being measured by the sensor.

Figure 5:
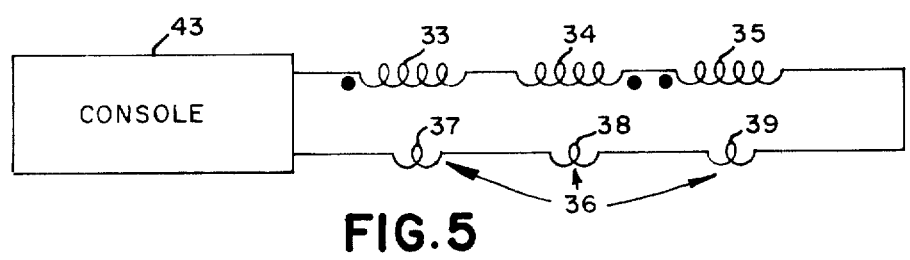
FIG. 5 is a block diagram and schematic of a magnetometer system using the sensor of FIG. 4.
Figure 4:
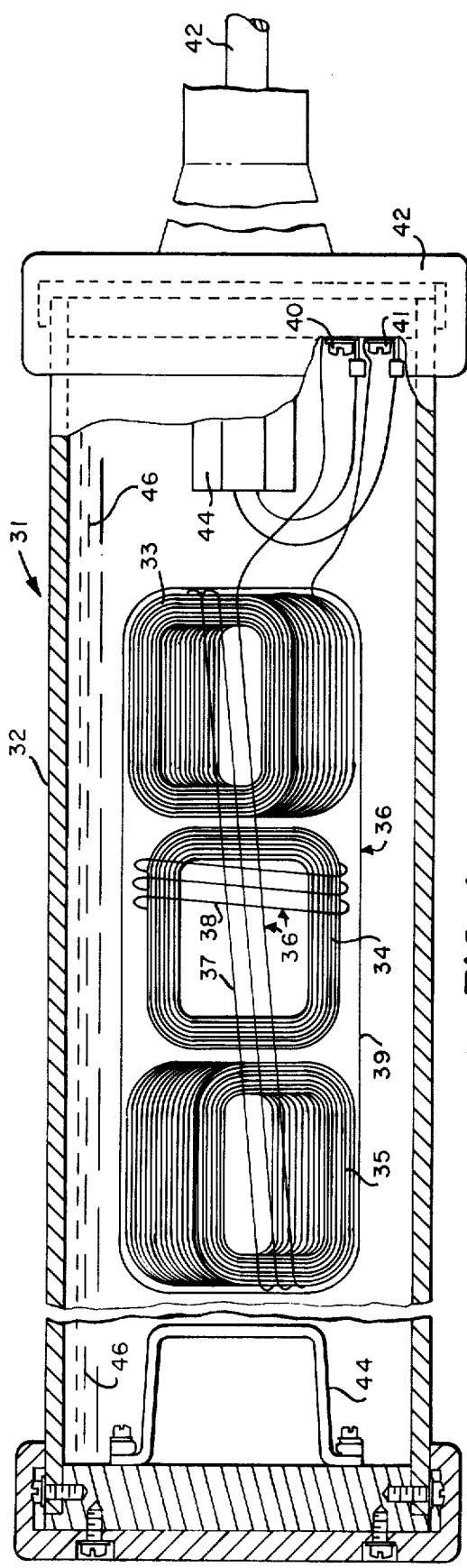
FIG. 4 is a cross-sectional view of a three-coil sensor in accordance with the present invention.

For use in marine magnetometry, there is provided, as shown in FIG. 4, another embodiment of the present invention comprising a sensor 31 having a fluid-tight housing 32 containing a proton laden fluid 45 such as white gas. Within housing 32 there are mounted, as by strapping, in a side-by-side relationship a plurality of solenoid coils 33, 34 and 35. Coils 33, 34 and 35 are made in the same fashion and electrically interconnected in series opposing relationships, as described with respect to the coils 6 and 7 of FIG. 1, as shown more clearly in FIG. 5. As in sensor 1 of FIG. 1, there is provided also in series with coils 33, 34 and 35 a compensating coil 36 comprising a plurality of windings 37, 38 and 39 of one or more turns about each of the three orthogonal axes of housing 32 and generally about the coils 33–35.

Coils 33, 34, 35 and 36 are electrically coupled internally of housing 32 to a pair of terminals 40 and 41 which are mounted at one end of housing 32 to a fluid-tight bulkhead 42. Terminals 40 and 41 are provided for further external connection to a ship-borne console 43 by means of a feed-through terminal 44 and cable conduit 45 extending through and from bulkhead 42. At the opposite end of housing 32 there is provided a diaphragm 44. Diaphragm 44 serves as a pressure equalizer for compensating for fluid expansion and contraction within the housing 32 and a pressure differential with respect to external pressure.

To minimize directional sensitivity of the sensor, which affects the amplitude of the precession signals generated by the sensor, coils 33, 34 and 35 are positioned within housing 32 with a relative angular relationship of 120° about an axis perpendicular to the principal axes A—A of the coils. Additional minimization of directional sensitivity may be obtained by including additional coils and reducing the angular relationship between them.

With a sensor in accordance with the present invention, the operation of a magnetometer system is substantially identical to that well known to those familiar with the equipment and procedures used in proton precession magnetometry. What is experienced with the sensor of the present invention, however, is an improved proton precession frequency sensitivity as a consequence of an increase in the signal-to-noise ratio of an otherwise conventional magnetometer system by a factor of three to four and more.

Figure 7:
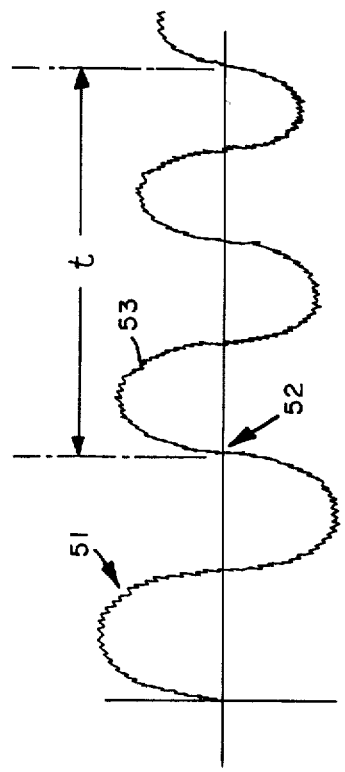
FIG. 7 is a graphic illustration of a typical proton precession signal as observed at the output of a sensor made in accordance with the present invention.
Figure 6:
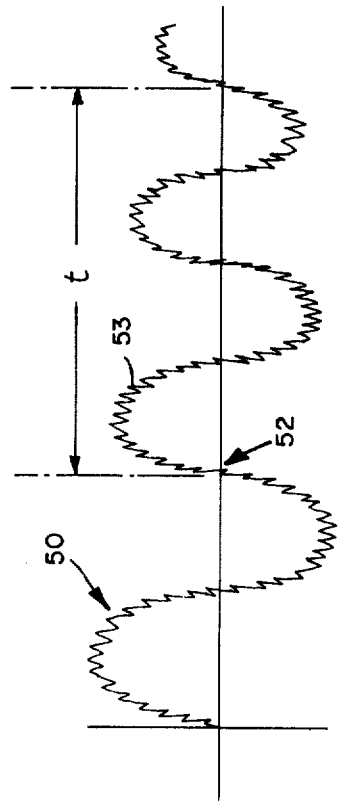
FIG. 6 is a graphic illustration of a typical proton precession signal as observed at the output of a prior known sensor.

Referring to FIGS. 6 and 7, there is illustrated, respectively, a proton precession signal 50 as is typically observed using an oscilloscope coupled across the output of a conventional sensor and an illustration of a proton precession signal 51 as is typically observed using an oscilloscope coupled across the output of a sensor in accordance with the present invention. Both signals are represented as containing noise superimposed on the principal signal. It will be observed, however, that the level of noise and, hence, the signal-to-noise ratio associated with the signal 51 illustrated in FIG. 7 is significantly reduced from that associated with the signal 50 illustrated in FIG. 6. Consequently, the start of a period or cycle count at a zero cross-over point, as at 52 in both figures, is much better defined in the signal 51 of FIG. 7 than it is in the signal 50 of FIG. 6. By having an improved definition of the starting point for a frequency or period measurement, the proton precession frequency sensitivity of the sensor is obviously improved.

It thus becomes apparent that the use of multistrand small-gauge wire in lieu of the prior known and conventionally used single-strand wire of comparable overall gauge has significantly increased the utility of magnetometers in general and portable magnetometers in particular. As is now clear, sensors, lighter in weight and smaller in size, may now be used by reducing the size of the coils without losing signal quality for a signal of a given intensity.

While illustrated and described in terms of two embodiments, it is understood that various other modifications and arrangements, such as, for example, the use of toroids or similarly shaped coils as the main coils and water as the proton laden fluid may be made without departing from the spirit and scope of the present invention as hereinafter claimed.

What is claimed is:

1. In a proton precession magnetometer having a housing for containing a proton-ladened fluid, a sensor comprising:
   a plurality of turns of multi-strand wire forming a main coil means for increasing the signal-to-noise ratio of said sensor; and
   means for mounting said main coil means within said housing.

2. A sensor according to claim 1 wherein said plurality of turns of said multi-strand wire forming said main coil means are distributed about a plurality of axes forming a plurality of coils of said multi-strand wire, each of said coils having a principal axis.

3. A sensor according to claim 2 wherein said plurality of coils are electrically coupled in a series opposing relationship.

4. A sensor according to claim 3 wherein said sensor has three orthogonal axes, and further comprising a compensation coil coupled in series with said main coils having a predetermined number of turns about each of the three orthogonal axes of said sensor.

5. A sensor according to claim 4 wherein the principal axis of each of said plurality of coils has a predetermined angular relationship with respect to the principal axis of others of said plurality of coils.

6. A sensor according to claim 5 wherein said plurality of coils comprises a first and a second coil and, further, wherein said principal axes of said first and said second coils are parallel.

7. A sensor according to claim 5 wherein said plurality of coils comprises a first, a second and a third coil and, further, wherein the principal axes of said coils are angularly displaced from each other about an axis perpendicular to said principal axes of said coils.

8. A sensor according to claim 7 wherein said angular displacement of said principal axes of said first, said second and said third coils is approximately 120°.

9. A sensor according to claim 5 further comprising: means for electrically coupling said coils to apparatus exterior of said housing.

10. A sensor according to claim 9 further comprising a means mounted in the interior of said housing for equalizing pressure interior and exterior of said housing.

* * * * *